(12) United States Patent
Sun et al.

(10) Patent No.: US 10,139,509 B2
(45) Date of Patent: Nov. 27, 2018

(54) ENHANCED SEISMIC IMAGING SYSTEMS AND METHODS EMPLOYING MODIFIED VELOCITY MODEL CONTRASTS

(71) Applicant: CHEVRON U.S.A. INC., San Ramon, CA (US)

(72) Inventors: Yonghe J. Sun, Cypress, TX (US); Craig S. Huber, Richmond, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 232 days.

(21) Appl. No.: 15/078,020

(22) Filed: Mar. 23, 2016

(65) Prior Publication Data

US 2017/0276813 A1 Sep. 28, 2017

(51) Int. Cl.
*G01V 1/30* (2006.01)
(52) U.S. Cl.
CPC .................................... *G01V 1/303* (2013.01)

(58) Field of Classification Search
None
See application file for complete search history.

(56) References Cited

U.S. PATENT DOCUMENTS 8,116,168 B1 * 2/2012 Luo ........................ G01V 1/282
367/50

OTHER PUBLICATIONS

Chambers, K., et al., The influence of phase boundary deflection on velocity anomalies of stagnant slabs in the transition zone, Sep. 27, 2003, Geophysical Research Letters, vol. 30, No. 18, 1965, doi: 10.1029/2003GL017754, 2003.

* cited by examiner

*Primary Examiner* — Cory W Eskridge
(74) *Attorney, Agent, or Firm* — Marie L. Clapp

(57) ABSTRACT

A method for seismic imaging of a subsurface volume of interest may include an imaging technique such as reverse time migration which uses a conditioned velocity model that replaces at least one sharp velocity transition with a gradual velocity transition including a velocity overshoot layer. The method may be performed by a computer system.

6 Claims, 5 Drawing Sheets

ENHANCED SEISMIC IMAGING SYSTEMS AND METHODS EMPLOYING MODIFIED VELOCITY MODEL CONTRASTS

BACKGROUND

Accurate seismic imaging of the earth's subsurface is crucial to the oil and gas industry. Seismic images are used, for instance, to determine the locations, types and characteristics of various subsurface formations, thereby facilitating hydrocarbon discovery and production including reservoir management such as well placement. Seismic imaging generally entails using a seismic source, such as a controlled explosion, to provide seismic waves into the subsurface of interest. The subsurface typically has numerous layers or formations, and each layer or formation has different characteristics, including the velocity at which seismic waves pass through. For example, seismic wave velocity in a sediment layer may be 7,500 feet per second, while an adjacent salt layer velocity may be 14,750 feet per second. For the purposes of this paper, a sediment layer may be unconsolidated sediment or consolidated sediment having relatively low seismic wave velocity as compared to distinct formations such as salt bodies with relatively high seismic wave velocity.

When seismic waves reach the boundaries between layers having different velocity profiles, some of the energy in waves are reflected off a boundary and echo back toward the surface. The remaining energy in the waves passes through the boundary and propagates toward the next boundary, and the process repeats. Many imaging techniques, including depth migration techniques such as reverse time migration (RTM), use the reflected energy recorded at the surface to image the subsurface rock boundaries.

High-contrast velocity boundaries (e.g., water-sediment and sediment-salt boundaries) cause several types of problems in an RTM image: (1) the introduction of backscattering noise, which is typically caused by the upward-bound energy present in the modeled wavefields due to reflections at the high-contrast boundaries; (2) wavelet distortion, which is caused by a longer wavelength on the higher velocity side of a boundary and a shorter wavelength on the lower velocity side of the boundary; (3) mis-position of the boundaries, typically caused by traditional smoothing techniques that alter the velocity near and above the boundary; and (4) discretization grid stair-casing diffraction noise. Smoothing is sometimes used to mitigate these concerns, but it does so inadequately.

SUMMARY

To address these issues, there are disclosed herein enhanced seismic imaging systems and methods employing modified velocity model contrasts without unduly distorting the structure of interest around and below the salt bodies. At least some of these embodiments are directed to a method for seismic imaging of a subsurface, comprising: obtaining seismic data that includes information about geologic layer boundaries in the subsurface; determining an initial velocity model of the subsurface wherein at least one geologic layer boundary occurs at a sharp velocity transition, wherein a velocity on a first side of the at least one geologic layer boundary is, for example, at least fifty percent higher than a velocity on a second side of the at least one geologic layer boundary; conditioning the initial velocity model to produce a conditioned velocity model, wherein the sharp velocity transition has been replaced by a gradual velocity transition including a velocity overshoot layer, where the gradual velocity transition is positioned to begin at the at least one geologic layer boundary and ramp into a geologic layer with minimal need of fine resolution of structures important for hydrocarbon exploration and the velocity overshoot layer is located inside the geologic layer with minimal need of fine resolution of structures, and wherein the velocity overshoot layer is designed to compensate for kinematic differences due to the gradual velocity transition; using the seismic data and the conditioned velocity model to generate a seismic image of the subsurface; and producing subsurface resources such as hydrocarbons using said seismic image.

At least some embodiments are directed to a computer system including computer modules which perform the method disclosed herein.

At least some embodiments are directed to a non-transitory computer-readable medium storing software code which, when executed by a processor, causes the processor to perform the method disclosed herein.

Figure 1:
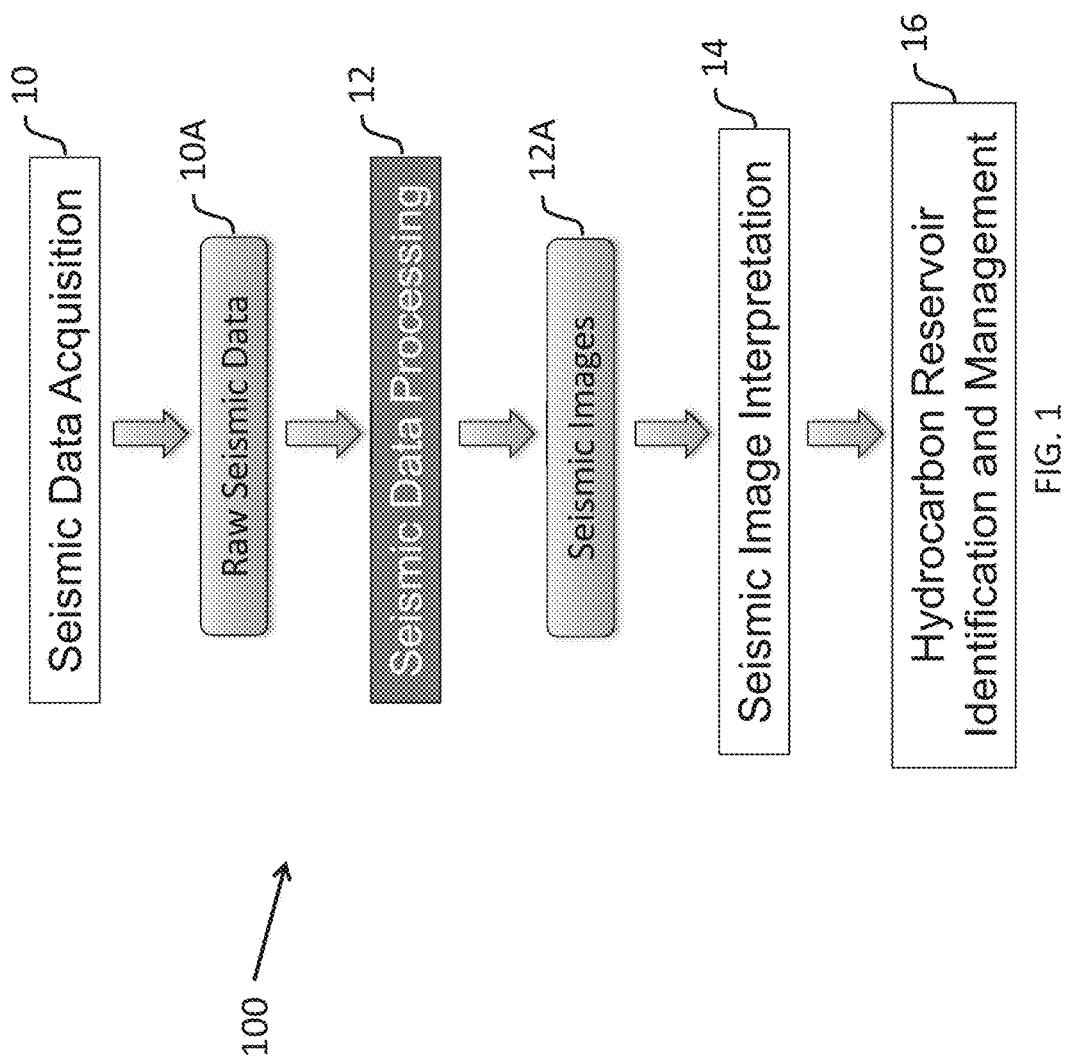
FIG. 1 is a flow diagram of the entire process disclosed herein.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Figure 2:
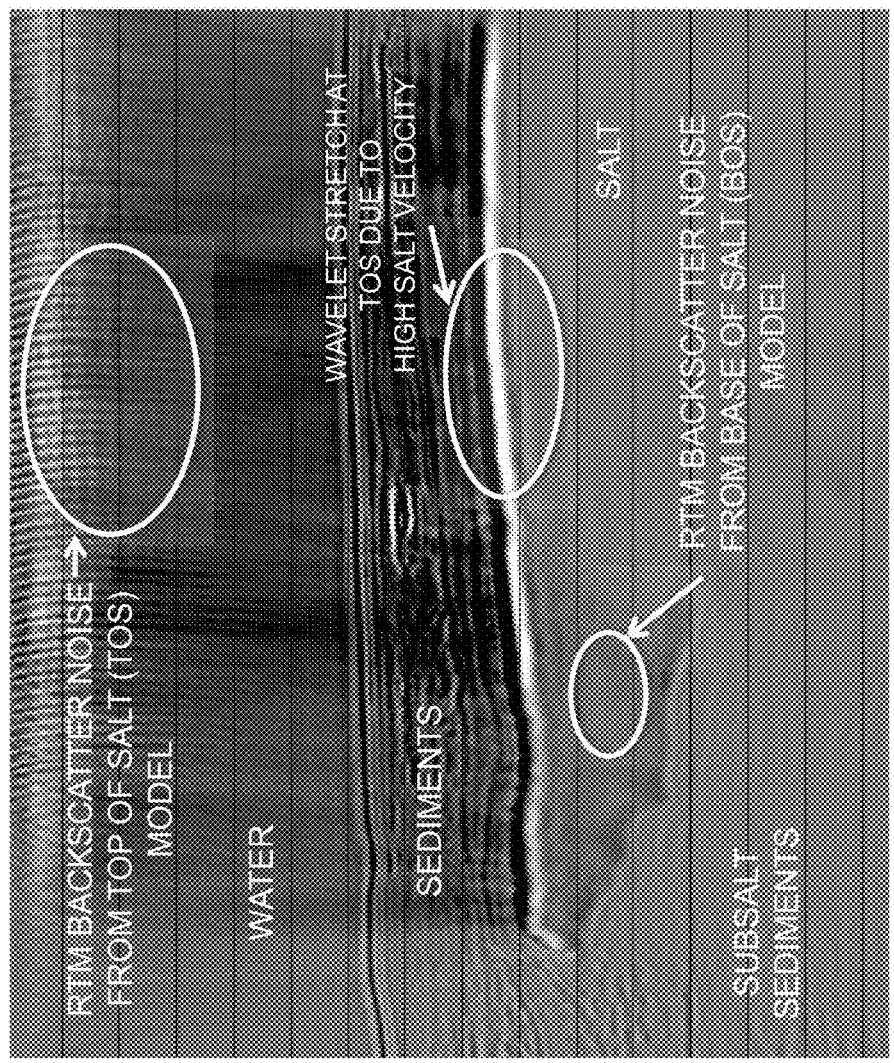
FIG. 2 is an example of a seismic image contaminated with artifacts which the disclosed techniques may be used to mitigate.

Exploring for and producing hydrocarbons from subsurface hydrocarbon reservoirs in general may be performed by following the method 100 shown in FIG. 1. Seismic data is acquired 10 over the subsurface volume of interest. The acquisition is performed with an active seismic source (e.g., air guns for a marine survey, vibrator trucks for a land survey) and a plurality of seismic sensors. The seismic waves travel from the active sources into the subsurface where they reflect and refract until they return to the seismic sensors, being recorded as raw seismic data 10A. The raw seismic data 10A is subjected to a variety of seismic data processing techniques 12 to produce seismic images 12A. The seismic images 12A may then be interpreted 14 to determine various geologic features of the subsurface volume of interest. The seismic images 12A and their interpretation 14 may then be used to identify hydrocarbon reservoirs in the subsurface and to manage the reservoir 16, including calculating hydrocarbon volumes within the reservoir, identifying optimum well placement, drilling wells, producing the hydrocarbons from the reservoir, and other reservoir management decisions such as enhanced production through injection wells and the like. However, seismic data processing 12 performed using conventional techniques may often produce seismic images 12A that contain significant artifacts. FIG. 2 shows an example of a seismic image generated using conventional techniques for a subsurface volume of interest including a salt body surrounded by sediments. There are areas affected by backscatter noise from the top of salt (TOS) and base of salt (BOS), as well as significant wavelet stretching at the top of salt due to the abrupt change in velocity from the sediments to the salt. These artifacts hinder seismic interpretation for identification of hydrocarbon reservoirs and reservoir management, including well placement for drilling.

Figure 3:
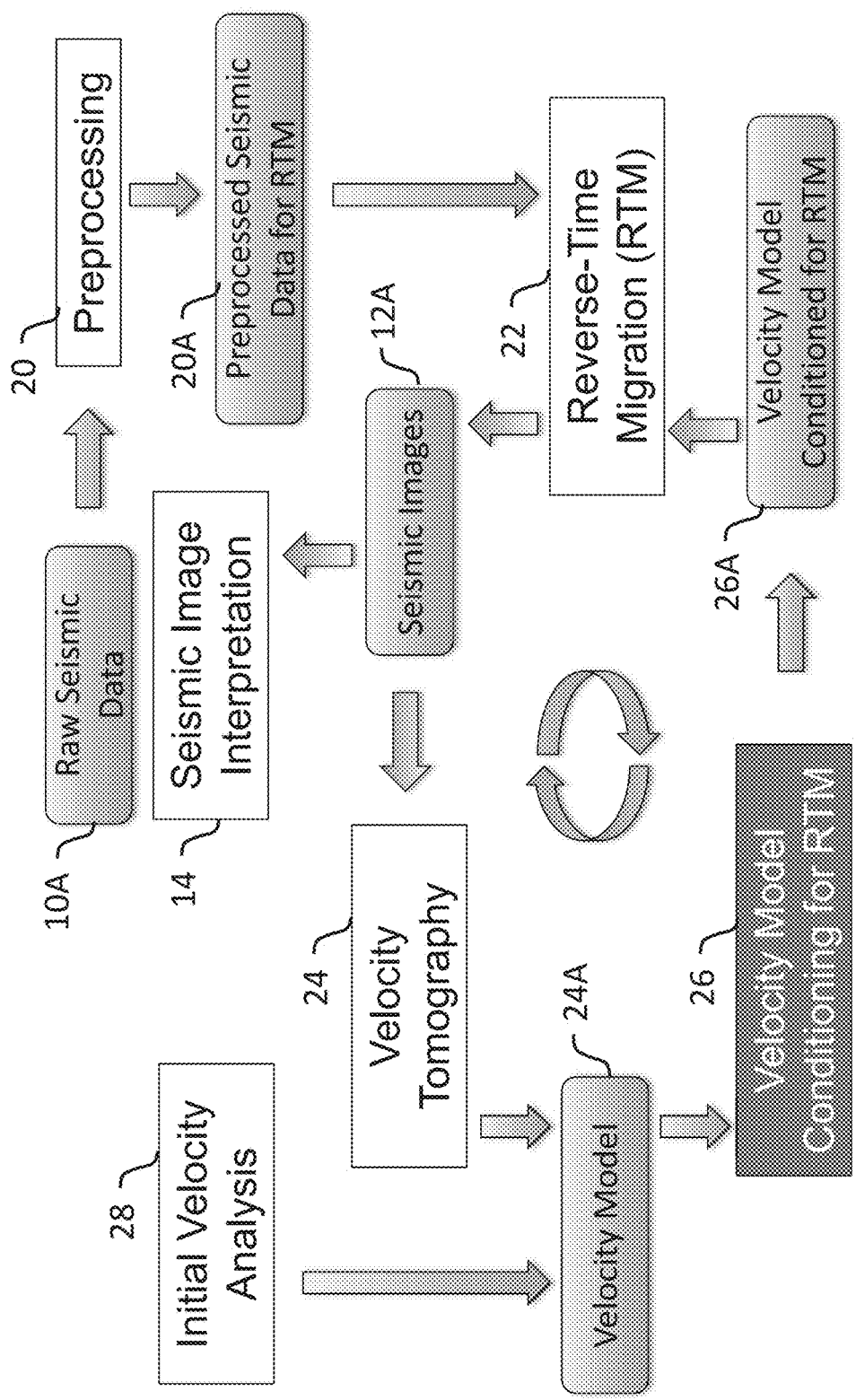
FIG. 3 is a flow diagram of a step of the disclosed process.

Disclosed herein are techniques for seismic data processing 12 to develop seismic images 12A using a subsurface velocity model that lessens the velocity (or "slowness") gradient between at least two strongly contrasting subsurface layers, thereby mitigating the negative effects associated with such sharp gradients. (Although the term "velocity model" is used herein, the term "slowness" is also used as an equivalent measure of speed with which seismic waves propagate through the subsurface. Slowness is the inverse of velocity and this inverse relationship should be accounted for, e.g., when using mathematical equations.) The technique is illustrated in the flowchart of FIG. 3. In addition to the raw seismic data 10A, an initial subsurface structure and velocity model 24A is obtained through an initial velocity analysis 28, such as semblance analysis or tomography 24. The initial velocity model 24A typically includes well-defined subsurface layers and other geo-bodies. The bodies are generally layers of sedimentary material or other forms of rock. The velocity model associates a seismic wave propagation slowness (or its inverse, velocity) with each of the bodies. The slowness can vary with subsurface positions and can be anisotropic, varying with the propagation direction of the waves. Thus, the velocity model may include a first slowness for a first layer in the subsurface (e.g., a sediment layer), and it may further include a second slowness for a second layer in the subsurface (e.g., a salt layer). For simplicity, this paper will often refer to two layers but in actuality, there are multiple layers throughout the subsurface, each of which may have different slowness values, the slowness values may vary even within a layer, and a layer may refer to a geologic region of any shape. The slowness values associated with each layer may be isotropic or anisotropic.

The initial velocity model includes a rate of change—that is, a gradient—from the first slowness to the second slowness. In many embodiments, this rate of change in the initial velocity model will be relatively high because the change in slowness values across boundaries is immediate or almost immediate, i.e., an abrupt change from one grid point in the spatial model to the next grid point if discretized. Consequently, some geo-modeling methods may "smooth" the transition, providing a small number of intermediate speeds in the slowness transition. Thus, the initial velocity model may transition from a sediment layer slowness of 1/(7,500 ft/s) to a salt layer slowness of 1/(14,750 ft/s) with few or no intermediate speeds in between these two slowness layers. As explained in the background section, smoothing of such sharp transitions between strongly contrasting slowness layers may produce artifacts and an undesirable degradation in the seismic image. An example of such degradation is mis-position of the reflector boundaries because smoothing alters the imaging velocity.

Such degradation can be mitigated by modifying the initial velocity model (velocity modeling conditioning 26) to produce a conditioned velocity model 26A. The conditioned velocity model 26A and preprocessed seismic data 20A (generated by preprocessing 20 the raw seismic data 12A) are used in reverse time migration 22 to create seismic images 12A. The velocity model conditioning is accomplished by replacing the high-contrast boundaries in the model with transition layers. A transition layer can be smooth or may include sublayers with a lesser slowness gradient than the original velocity model. In between the first and second slowness layers, however, the conditioned velocity model includes a ramp that provides a more gradual rate of change from the first slowness (i.e., the rate of change introduced by the ramp is less than the rate of change in the initial velocity model) with a compensating slowness overshoot to preserve the modeled seismic wave propagation time across the boundary. This ramp and overshoot may allow a gentler velocity gradient than the prior art method of smoothing. Moreover, the slowness modification is preferably confined to that side of the boundary having the fewest reflective features of interest, thereby minimizing any negative impacts of the modification to interpretability. In the case of a boundary between a sedimentary body and a salt body, the modification may be confined to the salt body, as such bodies may have fewer internal reflective features of which precise positioning is of critical interest.

The compensating overshoot mentioned above is to compensate for the travel time change caused by the use of the ramp in placed of the sharp gradient. The conditioned velocity model is used in tandem with the seismic data to perform a suitable processing technique (e.g., a known migration technique such as reverse time migration RTM) to generate a seismic image. The seismic image is then stored, transmitted, displayed, or some combination of the three.

Figure 4B:
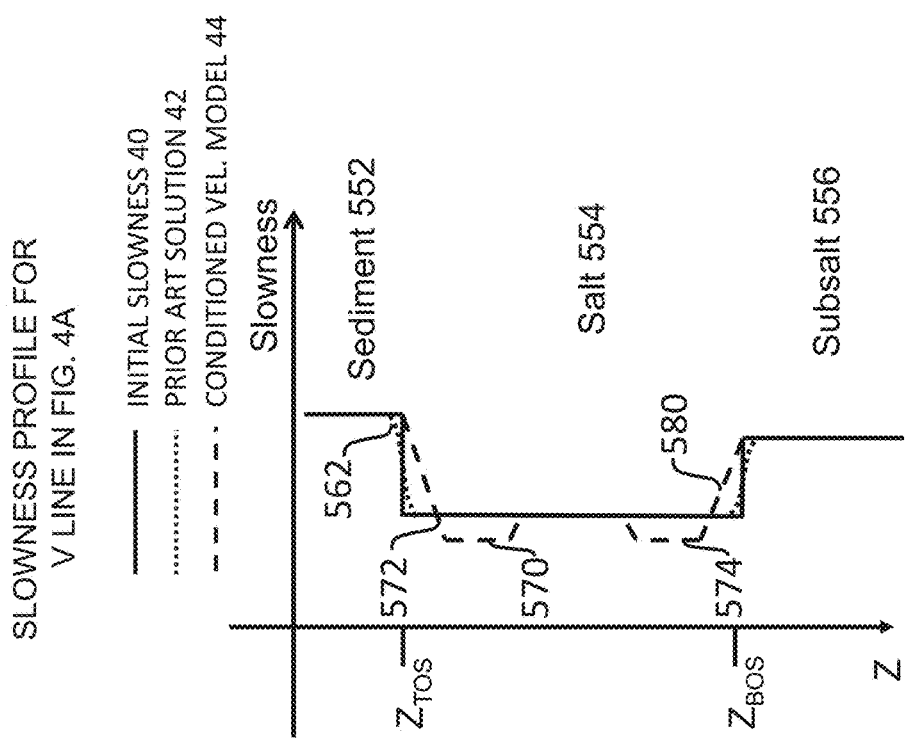
FIG. 4B is an illustrative representation of the slowness profile at the "V Line" of FIG. 4A, showing the initial slowness profile, the prior art solution as a dotted line, and the result of the disclosed techniques as a dashed line, wherein slowness is the inverse of velocity the z-coordinate measures the subsurface depth from the surface.
Figure 4A:
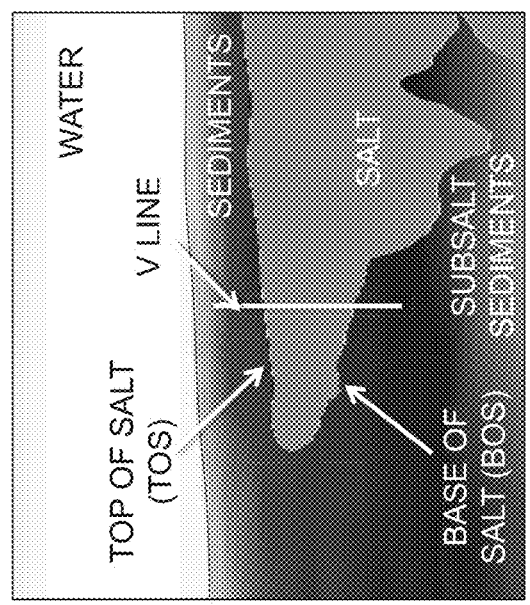
FIG. 4A is an illustrative representation of a subsea environment within which the disclosed techniques may be used.

FIG. 4B is a graph comparing initial and modified velocity model curves across an illustrative salt body, such as the salt layer of FIG. 4A. The graph includes a slowness-axis and a depth z-axis spanning a range in a subsurface of interest. Although a subsurface may have many layers of differing types, for the sake of clarity, the depth-axis in the graph only shows three illustrative layers: a sediment layer 552 (such as, for example, the sediment layer depicted in FIG. 4A), a salt layer 554 immediately adjacent to the sediment layer 552 (such as the salt shown in FIG. 4A), and a sub-salt layer 556 (e.g., the subsalt sediment layer in FIG. 4A) immediately adjacent to the salt layer 554. The layers and the choice of the depth-axis shown in the graph are merely exemplary and do not limit the scope of disclosure. On the contrary, the disclosed technique may be applied to any suitable subsurface layer boundary at which a sharp slowness gradient causes difficulty in depth migration processing of seismic data.

The graph includes curves representing three velocity models. The initial velocity model (represented by initial slowness 40) is developed using any suitable, available data (including received seismic data) and is performed using any suitable, known technique or combination of techniques. The graph illustrates the initial velocity model curve using a solid line. The prior art solution 42 simply smooths the transition, as shown by the dotted line. The other velocity model—called a conditioned velocity model 44—is developed by modifying the initial velocity model as described below. The graph illustrates the conditioned velocity model 44 curve using a dashed line.

Each of the different subsurface layers 552, 554, 556 influences the slowness of seismic waves passing through the layer, and the initial velocity model curve describes the changes in seismic wave slowness that may be observed in each of the layers. At the boundary between layers 552 and 554, the initial velocity model curve abruptly increases due to a sharp slowness gradient between sediment [e.g., approximately 1/(7,500 ft/s)] and salt [e.g., approximately 1/(14,750 ft/s)]. As shown, the slowness gradient of the initial velocity model is very steep and contains no or almost no intermediate slowness value(s) between the sediment layer and salt layer. As explained above, this sharp gradient produces undesirable features in using depth migration techniques to produce seismic images of the subsurface.

It is common to smooth the velocity model, shown as the prior art solution 42, which does, to some degree, alleviate some seismic imaging artifacts (e.g., imprints of picked salt boundaries and stair-casing diffractions) but the image is likely to be contaminated with the introduced artifacts as seen in FIG. 1. To mitigate the effects of the sharp gradients at subsurface layer boundaries and attenuate the artifacts from the prior art solution, the conditioned velocity model uses ramps (e.g., ramps 572, 580) in lieu of the sharp gradients. In at least some embodiments, the slowness ramps are piece-wise linear, having rates of change that are less than those associated with the initial model. More specifically, in the sediment layer 552 the conditioned velocity model includes the same slowness as the initial velocity model away from sharp boundaries. At a sharp boundary, however, the ramp 572 gradually decreases the slowness from the sediment layer slowness to an overshoot slowness instance 570. The overshoot slowness is less than the salt layer slowness to compensate for the increase in modeled time for a seismic wave to travel through the salt layer 554 on account of the ramp's decreased rate of change relative to the gradient 562 indicated for the prior art solution 42 and the gradient of the initial slowness 40. Stated another way, the ramp 572 decreases the rate of change from the relatively high slowness of the sediment layer 552 to the relatively low slowness of the salt layer 554. The region in which the slowness is greater than that of the initial slowness results in an increase in travel time through that region of the salt layer 554. To compensate for this increase in travel time, the ramp 572 decreases the slowness in the salt layer 554 to the overshoot slowness 570. The magnitude and/or depth duration (i.e., thickness) of the overshoot slowness, therefore, is selected to reduce travel time by an equal amount (e.g., at least in part based on the difference between the rate of change at gradient 562 and the rate of change at ramp 572) so as to ensure that the total seismic wave travel time through the salt layer 554 remains essentially unchanged relative to the initial velocity model. In some embodiments, however, the depth duration of an overshoot slowness instance is on the order of the dominant wavelength (e.g., approximately 10-20 Hz, ±50%) empirically determined for optimal reduction of wavelet stretch in salt and errors in sediment-salt boundary positioning in the seismic image. In any event, the travel time comparisons between initial and conditioned velocity models should be consistent. For instance, in some embodiments, the travel time in both models is determined assuming a seismic signal that enters the salt layer vertically or perpendicular to the salt layer's surface and passes through the salt layer in a straight line or an approximately straight line. Other variations on such travel time consistency measurements are contemplated. In addition, note that the ramp 572 begins at the same depth as the sharp gradient of the initial model, which means that the imaged event will be positioned at that depth. The prior art solution begins its gradient before the initial slowness changes, potentially resulting in a mis-positioned event. Using a ramp at the location of the sharp gradient and compensating for the adverse impact of ramping with overshoot in a region where positioning of images is less critical, the approach described in this invention can use velocity gradient much gentler (thus, less artifact or image positioning distortion) than can be allowed by smoothing practiced in prior art.

As shown in FIG. 4B, the ramp 572 is positioned within the salt layer 554. The scope of disclosure, however, is not limited to placing ramps inside any particular layer. In preferred embodiments, at any given boundary between two layers the ramp is placed in the layer with the fewest reflective features of interest. In this graph, salt has fewer reflective features of interest than sediment, so the ramp 572 is placed on the salt layer side of the boundary. In this way, undesirable impacts on measurement accuracy are mitigated, since few—if any—seismic waves will reflect from within the salt layer and toward the surface. Internal salt reflections, such as sutures, can be useful, but their precise positioning may not be as critical as the top or base of salt. Also as shown in FIG. 4B, the ramp 572 is linear. The scope of disclosure is not so limited, however, and other shapes for the ramp 572 (e.g., curved) are contemplated and may be implemented as suitable and desired.

The conditioned velocity model curve in FIG. 4B also includes another overshoot slowness instance 574. The overshoot slowness instance 574 is included to account for the increase in travel time presented by the ramp 580, which presents a rate of change moving from the salt 554 into the subsalt sediments 556 in the initial velocity model. The principles described above with respect to ramp 572 also apply to ramp 580 and, for brevity, are not repeated here.

The conditioned velocity model curve transitions to a salt slowness between overshoot slowness instances 570, 574 so that the total seismic wave travel time through the salt layer 554 remains essentially (but not exactly, due to ray bending) the same as it was with the initial velocity model. In some embodiments, the overshoot slowness instance 570 gradually transitions to the salt slowness instance. Similarly, the salt slowness instance gradually transitions to the overshoot slowness instance 574. Transitions of types other than ramps are contemplated, but ramps are preferred because of the advantages associated with gentler and simpler slowness gradients, as described above.

In some embodiments, the various ramps may be smoothed to provide a gentler gradient. In at least some embodiments, the smoothing is performed by determining a moving average applied in three spatial directions. Ramp smoothing may be performed using grids that are finer than those needed for wave propagation in, e.g., reverse time migration. Once determined using the finer grids, the smoothed ramp may be decimated (i.e., reduced in resolution by eliminating data points) to the desired grid size for use in reverse time migration once the final, conditioned velocity model has been determined.

Figure 5:
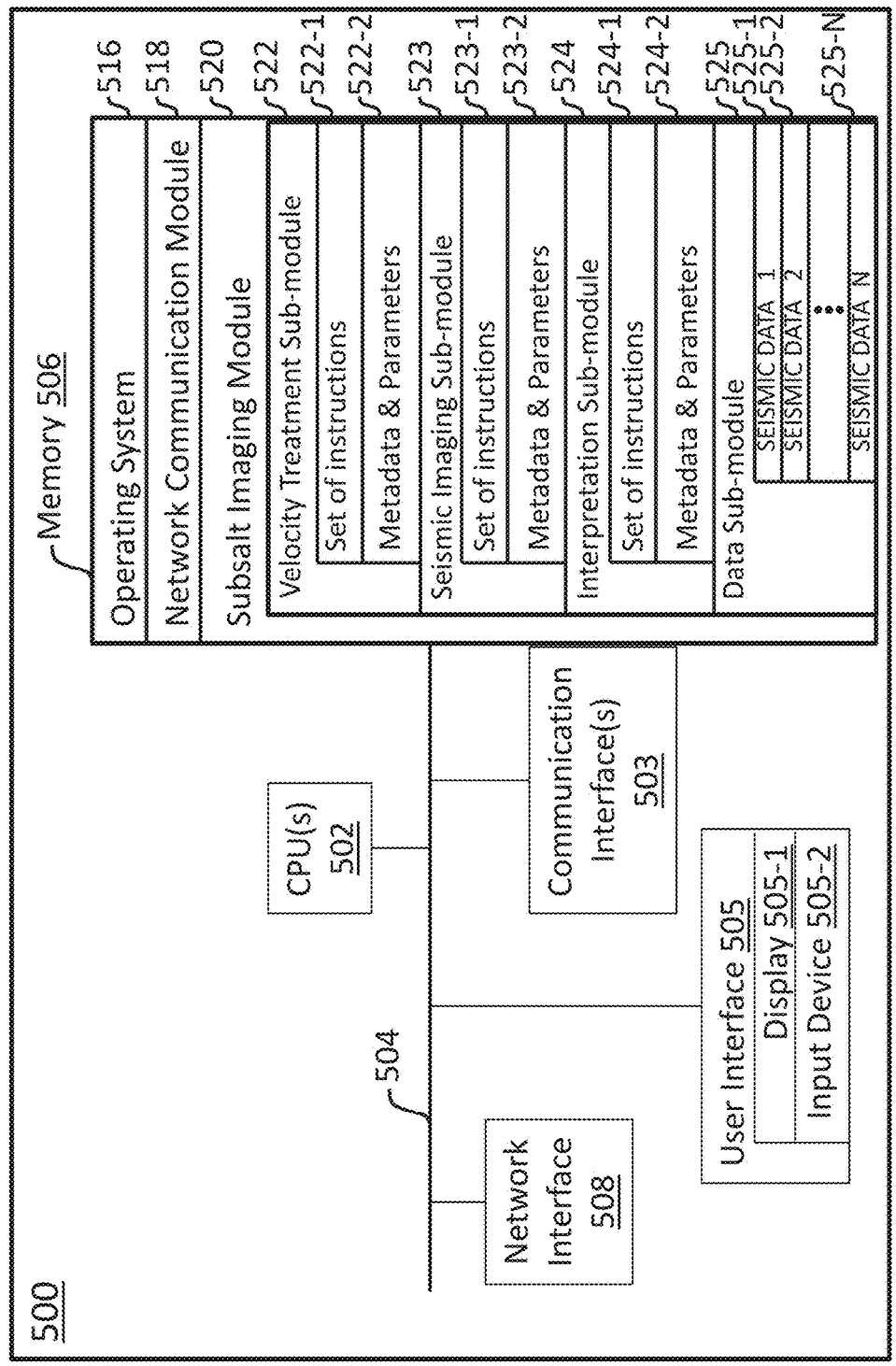
FIG. 5 is a block diagram of a computer system that may be used to implement the disclosed techniques.

FIG. 5 is a block diagram of a computer system 500 that may be used to implement the disclosed techniques. While certain specific features are illustrated, those skilled in the art will appreciate from the present disclosure that various other features have not been illustrated for the sake of brevity and so as not to obscure more pertinent aspects of the embodiments disclosed herein.

To that end, the computer system 500 includes one or more processing units (CPUs) 502, one or more network interfaces 508 and/or other communications interfaces 503, memory 506, and one or more communication buses 504 for interconnecting these and various other components. The computer system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the subsalt imaging module 520 executes the operations disclosed herein. The subsalt imaging module 520 may include data sub-module 525, which handles the seismic dataset including seismic gathers 525-1 through 525-N. This seismic data is supplied by data sub-module 525 to other sub-modules.

Velocity treatment sub-module 522 contains a set of instructions 522-1 and accepts metadata and parameters 522-2 that will enable it to execute operations to generate the conditioned velocity model. The seismic imaging sub-module 523 contains a set of instructions 523-1 and accepts metadata and parameters 532-2 that will enable it to contribute to the process shown in FIG. 3. The interpretation sub-module 524 contains a set of instructions 524-1 and accepts metadata and parameters 524-2 that will enable it to execute interpretation and possibly identification of hydrocarbon reservoirs and reservoir management. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

The method disclosed herein is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense.

The following is claimed:

1. A computer-implemented method for seismic imaging of a subsurface, the method being implemented in a computer system that includes one or more physical computer processors, the method comprising:
   obtaining, at the one or more computer processors, seismic data that includes information about geologic layer boundaries in the subsurface;
   determining an initial velocity model of the subsurface wherein at least one geologic layer boundary occurs at a sharp velocity transition, wherein a velocity on a first side of the at least one geologic layer boundary is at least fifty percent higher than a velocity on a second side of the at least one geologic layer boundary;
   conditioning, at the one or more computer processors, the initial velocity model to produce a conditioned velocity model, wherein the sharp velocity transition has been replaced by a gradual velocity transition including a velocity overshoot layer, where the gradual velocity transition is positioned to begin at the at least one geologic layer boundary and ramp into a geologic layer with minimal need of fine resolution of structures important for hydrocarbon exploration and the velocity overshoot layer is located inside the geologic layer with minimal need of fine resolution of structures, and wherein the velocity overshoot layer is designed to compensate for kinematic differences due to the gradual velocity transition;
   using the seismic data and the conditioned velocity model to generate a seismic image of the subsurface, at the one or more computer processors; and
   causing, by the one or more computer processors, an output representing with visual information of the seismic image of the subsurface, the visual information providing insight in interpreting geologic features based on the seismic image of the subsurface.

2. The method of claim 1 wherein the sharp velocity transition is between a sediment velocity and a salt velocity.

3. The method of claim 1 wherein the kinematic differences are modeled traveltime differences of seismic waves traveling through the subsurface.

4. The method of claim 1 wherein the seismic image is generated by reverse time migration.

5. A non-transitory computer-readable medium storing software code for seismic imaging of a subsurface which, when executed by a processor, causes the processor to:
- obtain seismic data that includes information about geologic layer boundaries in the sub surface;
- determine an initial velocity model of the subsurface wherein at least one geologic layer boundary occurs at a sharp velocity transition, wherein a velocity on a first side of the at least one geologic layer boundary is at least fifty percent higher than a velocity on a second side of the at least one geologic layer boundary;
- condition the initial velocity model to produce a conditioned velocity model, wherein the sharp velocity transition has been replaced by a gradual velocity transition including a velocity overshoot layer, where the gradual velocity transition is positioned to begin at the at least one geologic layer boundary and ramp into a geologic layer with minimal need of fine resolution of structures important for hydrocarbon exploration and the velocity overshoot layer is located inside the geologic layer with minimal need of fine resolution of structures, and wherein the velocity overshoot layer is designed to compensate for kinematic differences due to the gradual velocity transition;
- use the seismic data and the conditioned velocity model to generate a seismic image of the subsurface; and
- facilitate generation of output of visual information representing seismic image of the subsurface so that the visual information can be used for interpreting interpret geologic features based on the seismic image of the subsurface.

6. A computer system for seismic imaging of a subsurface comprising:
- one or more processors;
- a data storage device containing a plurality of single-shot migrated images, unstacked seismic images, or partially stacked seismic images and a dip dataset representative of a small range of structural dips at each image point of interest;
- memory; and
- one or more programs, wherein the one or more programs are stored in the memory and configured to be executed by the one or more processors, the one or more programs including instructions that when executed by the one or more processors cause the device to:
  - obtain seismic data that includes information about geologic layer boundaries in the subsurface;
  - determine an initial velocity model of the subsurface wherein at least one geologic layer boundary occurs at a sharp velocity transition, wherein a velocity on a first side of the at least one geologic layer boundary is at least fifty percent higher than a velocity on a second side of the at least one geologic layer boundary;
  - condition the initial velocity model to produce a conditioned velocity model, wherein the sharp velocity transition has been replaced by a gradual velocity transition including a velocity overshoot layer, where the gradual velocity transition is positioned to begin at the at least one geologic layer boundary and ramp into a geologic layer with minimal need of fine resolution of structures important for hydrocarbon exploration and the velocity overshoot layer is located inside the geologic layer with minimal need of fine resolution of structures, and wherein the velocity overshoot layer is designed to compensate for kinematic differences due to the gradual velocity transition;
  - use the seismic data and the conditioned velocity model to generate a seismic image of the subsurface; and
  - facilitate generation of output of visual information representing the seismic image of the subsurface so that the visual information can be used for interpreting interpret geologic features based on the seismic image of the subsurface.

* * * * *